March 16, 1943.  R. H. LEWIS  2,313,881
THEFTPROOF METER COVER
Filed June 18, 1940
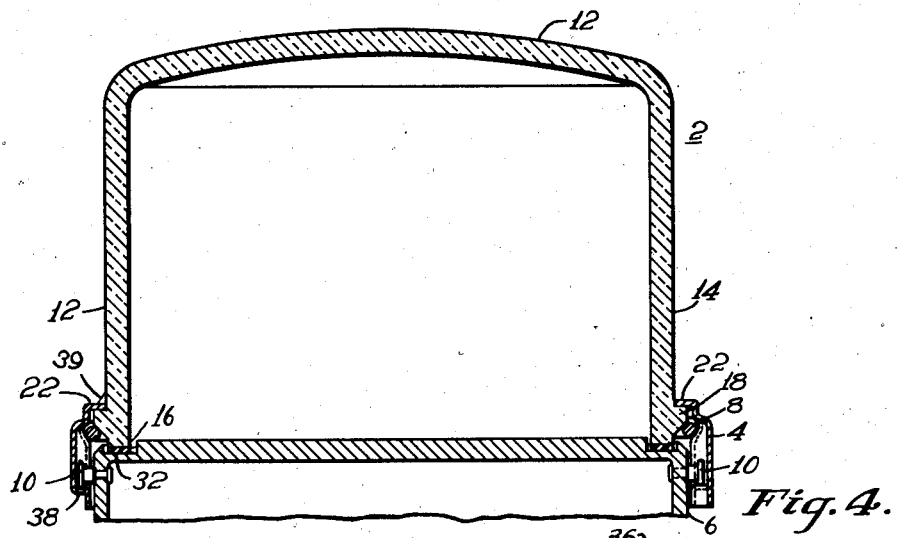
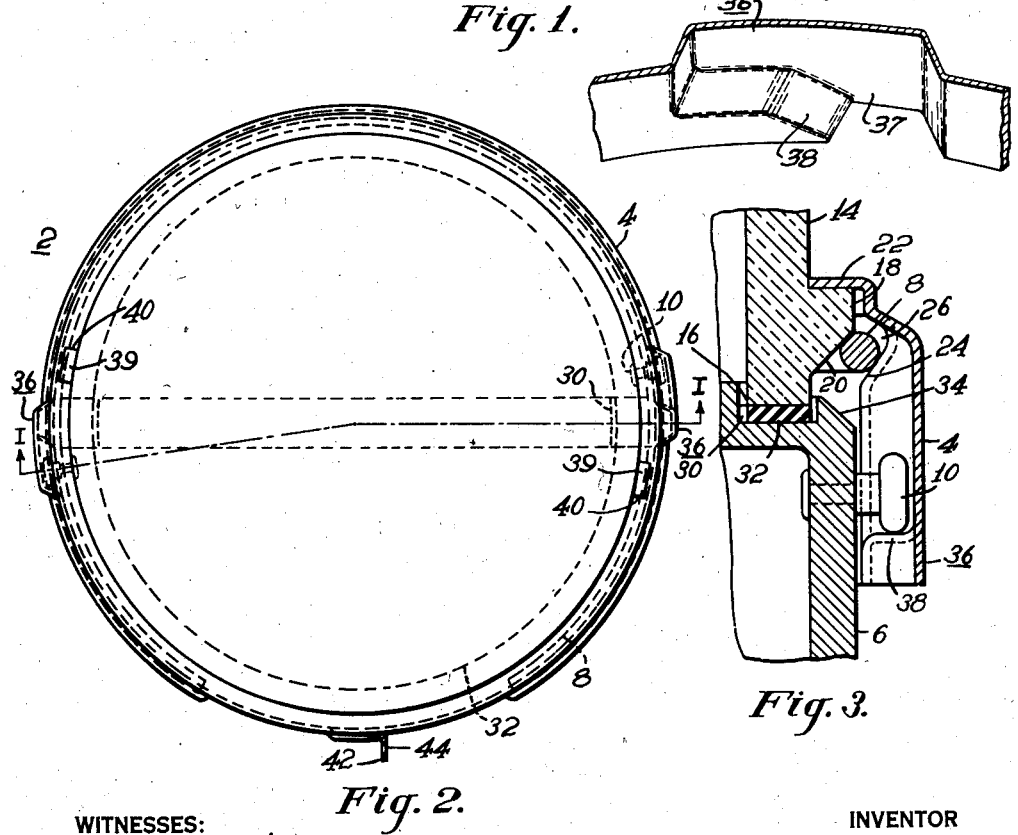
WITNESSES:
Edward Michaels
David Kreider
INVENTOR
Robert H. Lewis.
BY
ATTORNEY Patented Mar. 16, 1943

2,313,881

UNITED STATES PATENT OFFICE 2,313,881

THEFTPROOF METER COVER

Robert H. Lewis, West Orange, N. J., assignor to Westinghouse Electric & Manufacturing Company, East Pittsburgh, Pa., a corporation of Pennsylvania Application June 18, 1940, Serial No. 341,098

5 Claims. (Cl. 220—24)

The present invention relates to meter covers and it has particular relation to a theftproof arrangement for securing a meter cover upon the meter base.

In prior arrangements, there have been a number of openings through which it is possible for a consumer to extend a fine wire to either stop the metal disk or tamper with the operation of the meter register. Such openings exist, for example, where the clamping band is cut and lugs are provided to grip the outer periphery of the cover. In addition, it is usual to cut the flange to form bayonet receptacles for engagement with bayonet lugs on the meter base, and this often makes it possible to gain access to the interior of the device.

According to the present invention, a cover assembly is provided in which it is impossible to tamper with the meter mechanism. The meter cover is provided with a flange having an inclined lower edge which cooperates with a similarly inclined portion of the clamping band to form a pocket within which is disposed a member for securing the cover and band in position. In addition, the band preferably includes pressed out channel portions and communicating beveled shoulders for engaging the bayonet projections on the meter base. An upwardly extending perimetral projection may be provided on the meter base surrounding the outside of the cover rim to prevent the insertion of any device between the cover and base.

It is accordingly an object of the present invention to provide a novel and improved arrangement for securing a meter cover in position to a meter base.

Another object of the invention is to provide a simple and inexpensive meter cover arrangement.

Another object of the invention is to provide a means for securing a meter cover on a meter base in theftproof relationship.

A further object of the invention is to provide an improved means for securing a meter cover and clamping band in assembled condition.

Other objects and advantages of the invention will appear from the following detailed description taken in conjunction with the accompanying drawing, in which:

Figure 1 is a sectional view taken along the line I—I of Fig. 2 of a cover assembly embodying the present invention;

Fig. 2 is a top plan view of the apparatus of Fig. 1;

Fig. 3 is an enlarged detailed view of a portion of the device shown in Fig. 1; and Fig. 4 is an enlarged perspective view with parts broken away of the portion of the rim shown in Fig. 3.

The device shown in the drawing comprises generally a meter cover 2 secured by means of a clamping band 4 to a meter base 6. The clamping band is secured to the cover 2 by means of a spring member 8, while the flange is attached to the base 6 by a bayonet arrangement including lugs or projections 10.

The cover 2, which may be of glass or other frangible material that is transparent or partly transparent and partly translucent or opaque, is of substantially cup-shape, and preferably has integral end and side walls 12 and 14, respectively. Near the rim 16 of the cover is an outward laterally extending flange 18 which has a lower surface 20 beveled or inclined toward the side wall 14 of the cover.

The clamping band 4 includes a perimetral flange 22 for engagement with the upper surface of the cover flange 18 and an inwardly inclined wall portion 24 which cooperates with the surface 20 of the cover flange 18 to provide a pocket 26. This pocket 26 preferably extends along a major portion of the periphery of the cover and band, as shown particularly in Fig. 2. A split spring member 8, with substantially the same configuration as the pocket 26, is disposed within this pocket to engage the surface 20 of the cover flange 18 and the inclined wall surface 24 of the clamping band. This spring is biased outwardly against the upwardly sloping surface 24, and thus remains in position between the cover flange and clamping band to retain them in assembled condition.

The rim 16 of the cover 2 is disposed in a perimetral groove 30 in the top of the meter base 6 with a sealing gasket 32 therebetween. In accordance with the invention, it is preferred to provide the base 6 with a projection 34 extending around the cover rim 16 to a point above the gasket 32 to provide an additional barrier to any device which one may attempt to extend to the inside of the cover. To the side walls of the meter base 6 are secured the lugs 10 which serve as bayonet projections.

The clamping band 4 is preferably of sheet metal, and diametrically opposed portions indicated at 36 may be pressed outwardly to provide channels for receiving the bayonet projections 10. As is best shown in Figs. 3 and 4, each of these projections 36 includes a front portion forming an entrance channel at 37 and a rear shoulder portion 38 sloping upwardly therefrom.

Thus the lugs 10 are initially received in the channels 37 and the band is then displaced in a clockwise direction relative to the base to bring the lugs in engagement with the upper or rear part of the shoulder 38 and tighten the cover assembly. While only a single pair of bayonet projections and receptacles have been shown, it will be evident that a greater number may be provided if desired.

Diametrically opposed lugs 39 may be provided on the upper surface of the cover flange 18 to engage recesses 40 in the flange 22 of the clamping band 4, and thus prevent relative rotation between the cover and band when in assembled condition. A lug 42 of a usual type and having an eyelet 44 may be secured to the clamping band 4 for receiving a sealing wire of the type commonly provided by power companies for preventing unauthorized removal of the cover.

From the above description, the means of assembling the device will readily appear. The clamping band 4 is first inserted over the cover with its flange 22 engaging the upper surface of the cover flange 18. The spring ring 8 is then slightly compressed and inserted in the pocket 26, thereby securing the cover and band together. This assembly is then inserted over the meter base so that the lugs 10 pass into the channel formed by the projections 36. After this, the cover and band are rotated in a clockwise direction to tighten the cover rim against the gasket 32. A sealing wire may then be inserted through the eyelet 44 and a corresponding opening provided on the meter base to lock the assembly in closed position.

It will now be evident that the present invention provides a simple and inexpensive theftproof arrangement for assembling a meter cover. No openings such as would permit the insertion of a wire therethrough are provided on the clamping band 4. The presence of the perimetral projection 34 offers an additional barrier to any device which it might be attempted to insert from a lower edge of the clamping band 4.

While a particular form of the invention has been shown and described, changes may be effected therein without departing from the spirit and scope as set forth in the appended claims.

I claim as my invention:

1. In combination with a cup-shaped cover member embodying a perimetral flange having a beveled annular surface portion converging toward its open end, a flanged clamping band engaging a surface of said cover flange opposite the beveled surface portion thereof and having a beveled portion forming a substantially annular pocket between it and said beveled portion of said cover flange, and a split annular spring member disposed in said pocket and biased against the beveled portion of said band to secure it in assembled position on said cover member.

2. In an electrical meter, a base, a cup-shaped cover with a rim engaging said base and a laterally extending flange adjacent said rim, said flange including a beveled outer annular surface converging toward the open end of said cover, a flanged clamping band engaging a surface of said cover flange opposed to said beveled surface and having a similarly converging surface forming a substantially annular pocket between it and the beveled surface of said cover flange, a split annular spring member removably disposed in said pocket in contact with the converging surface of said cover flange and biased against the converging surface of said band to secure it in assembled position on said cover, and means for detachably clamping said band to said base.

3. In an electrical meter, a base, a frangible cup-shaped cover with a rim engaging said base and a laterally extending flange adjacent said rim, at least a portion of the outer surface of said flange along its perimeter being inclined toward the open end of said cover, a clamping band having a flange engaging a surface of said cover flange opposed to said inclined surface and a portion inclined toward said base to form a pocket between it and the inclined surface of said cover flange over at least a major portion of its perimeter, a spring member of corresponding shape disposed in said pocket in engagement with the inclined surface of said cover flange and biased against the inclined portion of said band to bias said cover flange against the flange on said band, and means for detachably clamping said band to said base.

4. In an electrical meter, a base, a cup-shaped cover with a rim engaging said base and a laterally extending flange adjacent said rim, said cover flange having a lower surface extending inwardly at an acute angle with the surface of said rim, a clamping band having a perimetral flange engaging the upper surface of said cover flange and a portion extending inwardly at an acute angle to said perimetral flange to form a pocket between it and the beveled portion of said cover flange, a spring member of substantially circular cross-section disposed in said pocket and biased outwardly against the beveled portion of said band to secure it in assembled position on said cover member, and means for detachably clamping said band to said base.

5. A theftproof cover assembly for an electrical meter comprising a base having bayonet projections thereon, a cup-shaped cover with a rim engaging said base and a laterally extending flange with a surface portion inclined to said cover, a perimetral baffle extending from said base outside of said cover to form a barrier about the joint between the cover rim and base, a clamping band surrounding said cover flange and said baffle and having a flange portion engaging a surface of said cover flange opposed to said inclined surface, means on said clamping band associated with said inclined cover flange surface to form a pocket therebetween, and spring means disposed in said pocket to secure said cover member and said band in assembled position, said clamping band having outwardly extending portions for engagement by said bayonet projections and sloping shoulder portions communicating therewith to permit tightening of said cover against said base by rotatively displacing said band relative thereto.

ROBERT H. LEWIS.